United States Patent Office 3,261,860
Patented July 19, 1966

3,261,860
PRODUCTION OF AROMATIC CYANO-
CARBOXYLIC ACIDS
Friedrich Becke, Heidelberg, and Gerhard Mutz, Mannheim, Germany, assignors to Badische Anilin- & Soda-Fabrik Aktiengesellschaft, Ludwigshafen (Rhine), Germany
No Drawing. Filed Jan. 28, 1963, Ser. No. 254,415
Claims priority, application Germany, Feb. 2, 1962,
B 65,776
3 Claims. (Cl. 260—465)

This invention relates to the production of aromatic cyanocarboxylic acids from aromatic cyano compounds having an oxidizable side chain. More specifically, the invention relates to the use of specific solvents in the oxidation.

It is known that cyanocarboxylic acids are obtained by air oxidation of cyanobenzenes having an oxidizable side chain at a temperature between 150° and 260° C. in the liquid phase in the presence of catalysts comprising heavy metal salts or heavy metal oxides. The liquid phase is preferably maintained by superatmospheric pressure. It is also known to use xylenes as solvents. In this method, a mixture of cyanobenzenecarboxylic acids and oxidation products of xylene are obtained.

In all prior methods, only relatively low conversions are achievable so that separation of the cyanobenzenecarboxylic acids and recycling of the unreacted material is rather expensive.

It is an object of the present invention to provide a process for the production of aromatic cyanocarboxylic acids in which the oxidation can be carried out at high conversions. Another object of the invention is to provide a process for the production of aromatic cyanocarboxylic acids which gives high yields. A further object of the invention is to provide a process for the production of aromatic cyanocarboxylic acids in which the method of working up the reaction mixture is especially simple.

We have found that benzene or napthalene compounds having a cyano group and at least one carboxyl group are obtained from the corresponding aromatic nitriles containing at least one oxidizable side chain in high yields and purity even at high conversions by oxidation with oxygen or oxygen-containing gases at elevated temperature, if desired under superatmospheric pressure, in the presence of salts or oxides of one or more metals having variable valency, by carrying out the oxidation in the presence of at least one mole of a carboxylic anhydride of a low molecular weight fatty acid, preferably of acetic anhydride, per mole of compound to be oxidized, at a temperature of 75° to 150° C., preferably at 90° to 110° C.

The initial materials may be mononuclear or polynuclear aromatic compounds containing one nitrile group and one to three oxidizable side chains, i.e. nitriles of the benzene or naphthalene series are suitable. Examples of oxidizable side chains which may be present are alkyl groups with one to four carbon atoms, hydroxyalkyl groups with one to four carbon atoms which may be esterified with low molecular weight alkancarboxylic acids with one to five carbon atoms, aldehyde groups, keto groups having two to five carbon atoms, acetal groups, chloroalkyl or bromoalkyl groups with one to four carbon atoms. Compounds which contain one or more cyano groups and one or more oxidizable side chains may also be oxidized.

The following are examples of compounds which are suitable for oxidation: tolunitriles, ethylbenzonitriles, isopropylbenzonitriles, methylcyanonaphthalenes, hydroxymethylbenzonitriles, cyanobenzyl halides, cyanobenzal halides, cyanoacetophenones, dimethylbenzonitriles (xylonitriles), diethylbenzonitriles, methylethylbenzonitriles, diisopropylbenzonitriles, trimethylbenzonitriles, dimethylcyanonaphthalene, dicyanotoluenes and dicyanoxylenes.

Pure oxygen or gas mixtures which contain free oxygen, for example air, may be used for the oxidation.

Suitable catalysts are salts or oxides of heavy metals having variable valency such as are known as oxidation catalysts. Examples of these are salts or oxides of lead, vanadium, chromium, molybdenum, tungsten, manganese and cobalt. It is possible to use chlorides, bromides, nitrates or salts of organic carboxylic acids, such as acetates, propionates or naphthenates, as well as oxides. They may be used singly or in admixture.

Examples of suitable oxidation catalysts are: cobalt chloride, cobalt bromide, cobalt acetate, cobalt nitrate, manganese chloride, manganese bromide, manganese acetate, manganese nitrate, lead dioxide or vanadium pentoxide.

The catalyst is generally added in an amount of 0.01 to 5% by weight, preferably about 0.5 to 1.0% by weight, with reference to the cyano compound to be oxidized.

The carboxylic anhydrides used are those of low molecular weight fatty acids, for example of saturated aliphatic carboxylic acids (alkanecarboxylic acids) with two to four carbon atoms in each carboxylic acid group. Examples are: acetic anhydride, propionic anhydride, butyric anhydride or mixed anhydrides, such as acetic-propionic anhydride. Acetic anhydride is preferred. It is necessary to use at least 1 mole of acid anhydride for each mole of initial compound; ratios of two to six moles of carboxylic anhydride to each mole of initial compound are preferred.

Oxidation is effected in the way usual for air oxidation at elevated temperature in the range of about 70° to 150° C. particularly between 90° and 110° C.

Working up may be for example by distilling off the solvent and then recrystallizing or—if possible—distilling under subatmospheric pressure. In many cases the compounds formed are substantially insoluble in the acid anhydride solution used and then are immediately precipitated.

Good yields are obtained according to this invention, even at high conversions, and only small amounts of by-products are formed.

Although it is known that the induction period in the air oxidation of aromatic hydrocarbons having oxidizable side chains can be shortened by adding small amounts (0.1 to 0.2% by weight) of acid anhydrides, it was not to be foreseen that the use of considerably larger amounts of the acid anhydrides would lead to an increase in the conversion without any decline in the yields.

The invention is further illustrated by the following examples.

Example 1

Oxygen is passed at the rate of 50 liters per hour for eight to twelve hours into a solution of 640 g. of p-tolunitrile, 2.5 g. of cobalt bromide and 2.5 g. of manganese bromide in 2000 g. of acetic anhydride in a 4-l. four-necked flask provided with a stirrer, thermometer, gas inlet pipe (extending to the bottom of the flask) and a gas outlet. When the reaction temperature reaches about 100° C., the reaction mixture becomes dark brown in color. After about six hours, the contents of the flask become cloudy and the reaction is completed in another two to six hours. The reaction is ended when no more oxygen is absorbed. The contents of the flask are cooled and thus solidified to a solid paste which is stirred into water and filtered. The filter cake is washed with cold water and dried. 620 g. of p-cyanobenzoic acid (melting point 217° to 219° C., equivalent weight 148) is obtained. 54 g. of p-tolunitrile is recovered from the mother liquor by steam distillation and another 80 g. of p-cyanobenzoic acid by concentration. The conversion is therefore 87.2% and the yield, with reference to reacted p-tolunitrile, is 95.6%.

*Example 2*

640 g. of m-tolunitrile is used instead of p-tolunitrile in Example 1, the procedure otherwise being the same. 733 g. of m-cyanobenzoic acid is obtained, equivalent to a yield of 91.2% with reference to m-tolunitrile.

*Example 3*

320 g. of p-cyanoethylbenzene is oxidized in the way described in Example 1. Pure p-cyanobenzoic acid is obtained in a yield of 73% with reference to p-ethylbenzonitrile.

*Example 4*

350 g. of 1,3,5-dimethylbenzonitrile is dissolved in 200 g. of acetic anhydride and oxidized in the way described in Example 1. The solid oxidation mixture obtained is filtered off and separated by fractional crystallization from methanol. 310 g. of trimesic acid mononitrile having a melting point of 330° C. and an equivalent weight of 97 (theoretical 95.5) and 85 g. of 3-methyl-5-cyanobenzoic acid (melting point 169° C. to 170° C.) having an equivalent weight of 165 (theoretical 161) are obtained.

*Example 5*

670 g. of 4-methyl-1-naphthonitrile is oxidized in the way described in Example 1. 520 g. (66% of the theory) of 4-cyano-1-naphthonitrile (melting point 231° C.) having an equivalent weight of 201 (theoretical 197) is obtained.

We claim:

1. A process for the production of cyanocarboxylic acids selected from the group consisting of benzene cyanocarboxylic acids and naphthalene carboxylic acids which comprises: passing a gas selected from the group consisting of oxygen and mixtures of oxygen and nitrogen in the presence of an oxidation catalyst selected from the group consisting of cobalt salts, manganese salts and mixtures thereof at a temperature of 75° C. to 150° C. through a liquid mixture of a carboxylic anhydride derived from a saturated aliphatic carboxylic acid with 2 to 4 carbon atoms and an aromatic cyano compound selected from the group consisting of benzene cyano compounds and naphthalene cyano compounds having 1 to 2 oxidizable side chains with at least one carbon atom immediately bound to the aromatic nucleus and with a total of 1 to 4 carbon atoms, said aromatic cyano compound and said carboxylic anhydride being applied in a molar ratio of 1:1 to 1:6.

2. A process as claimed in claim 1, in which the carboxylic anhydride is acetic anhydride.

3. A process as claimed in claim 1, in which the oxidation catalyst is a mixture of cobalt bromide and manganese bromide.

References Cited by the Examiner
UNITED STATES PATENTS

| | | | |
|---|---|---|---|
| 2,744,925 | 5/1956 | Toland | 260—465 |
| 2,833,816 | 5/1958 | Saffer et al. | 260—524 |
| 3,064,046 | 11/1962 | Taylor et al. | 260—524 |

CHARLES B. PARKER, *Primary Examiner.*

DALE R. MAHANAND, *Assistant Examiner.*